(12) United States Patent
Giordano et al.

(10) Patent No.: US 8,994,812 B2
(45) Date of Patent: Mar. 31, 2015

(54) OPTICAL SENSOR FOR DETECTING THE LIQUID LEVEL IN A CONTAINER, IN PARTICULAR FOR A REMOVABLE CONTAINER FOR AN ELECTRIC HOUSEHOLD APPLIANCE AND ASSOCIATED LENS AND METHOD

(75) Inventors: Sergio Giordano, Caselle (IT); Alessio Chianura, Vigevano (IT); Domenico Pietrafesa, San Mauro Torinese (IT); Klemen Dobravec, Tolmino (SI)

(73) Assignee: Illinois Tool Works Inc., Glenview, IL (US)

( * ) Notice: Subject to any disclaimer, the term of this patent is extended or adjusted under 35 U.S.C. 154(b) by 348 days.

(21) Appl. No.: 13/388,756

(22) PCT Filed: Aug. 3, 2010

(86) PCT No.: PCT/IB2010/001922
§ 371 (c)(1),
(2), (4) Date: Feb. 3, 2012

(87) PCT Pub. No.: WO2011/015934
PCT Pub. Date: Feb. 10, 2011

(65) Prior Publication Data
US 2012/0133759 A1  May 31, 2012

(30) Foreign Application Priority Data

Aug. 4, 2009  (IT) .............................. TO2009A0606
Nov. 23, 2009  (IT) .............................. TO2009A0902

(51) Int. Cl.
*H04N 7/18* (2006.01)
*G01F 23/292* (2006.01)
*G02B 17/06* (2006.01)

(52) U.S. Cl.
CPC .......... *G01F 23/292* (2013.01); *G02B 17/0668* (2013.01)
USPC .......................................................... 348/81

(58) Field of Classification Search
CPC .......... H04N 7/18; H04N 7/183; H04N 5/225; G06K 9/00771; G07C 5/0891
USPC ................ 348/81; 73/290; 340/619; 250/227
See application file for complete search history.

(56) References Cited

U.S. PATENT DOCUMENTS 4,039,845 A   8/1977 Oberhansli et al.
4,961,069 A * 10/1990 Tsaprazis ....................... 340/619
(Continued)

FOREIGN PATENT DOCUMENTS

CH   580802 A5   10/1976
CN   101113921 A   1/2008
(Continued)

OTHER PUBLICATIONS

ISR for PCT/IB2010/001922 dated Dec. 23, 2010.
(Continued)

*Primary Examiner* — Dave Czekaj
*Assistant Examiner* — Berteau Joisil
(74) *Attorney, Agent, or Firm* — Lowe Hauptman & Ham LLP

(57) ABSTRACT

An optical sensor including a photo emitting element and a photo receiving element carried side-by-side by a supporting and feeding element either associated or associable in use with a support for a container, and a composite lens, either associated or associable with the container, designed so as to remain in use immersed in a liquid contained in the container and facing the photo emitting and photo receiving elements; the lens including: a first cylindrical body made of a light-permeable material, mountable in use vertically from the top of the container facing the photo emitting and photo receiving elements to a bottom wall of the container; and a second cylindrical body, arranged concentrically with and outside the first body and open towards the bottom wall; respective side walls of the first and second cylindrical bodies having the same length, that of the second body being separated from that of the first body by a predetermined annular clearance, and being made so as to be at least partially reflecting towards the first cylindrical body.

23 Claims, 2 Drawing Sheets

(56) References Cited

U.S. PATENT DOCUMENTS

| | | | | |
|---|---|---|---|---|
| 5,068,527 | A | * | 11/1991 | Iwamoto et al. ......... 250/227.21 |
| 5,804,831 | A | * | 9/1998 | Romatzick ................... 250/577 |
| 6,173,609 | B1 | | 1/2001 | Modlin et al. |
| 7,049,622 | B1 | | 5/2006 | Weiss |
| 7,191,649 | B1 | | 3/2007 | Coogle |
| 7,535,571 | B2 | | 5/2009 | Dietz et al. |
| 2005/0178197 | A1 | * | 8/2005 | Ramus et al. ............... 73/290 V |
| 2009/0084995 | A1 | | 4/2009 | Cierullies et al. |

FOREIGN PATENT DOCUMENTS

| | | |
|---|---|---|
| DE | 102006014277 A1 | 9/2007 |
| FR | 2653555 A1 | 4/1991 |
| GB | 2149112 A | 6/1985 |
| JP | 2007248375 A | 9/2007 |

OTHER PUBLICATIONS

Search Results for Italian Application No. TO2009A000606 dated Mar. 25, 2010.

* cited by examiner

OPTICAL SENSOR FOR DETECTING THE LIQUID LEVEL IN A CONTAINER, IN PARTICULAR FOR A REMOVABLE CONTAINER FOR AN ELECTRIC HOUSEHOLD APPLIANCE AND ASSOCIATED LENS AND METHOD

RELATED APPLICATIONS

The present application is national phase of PCT/IB2010/001922 filed Aug. 3, 2010, and claims priority from Italian Application Number TO2009A000606 filed Aug. 4, 2009, and Italian Application Number TO2009A000902 filed Nov. 23, 2009.

TECHNICAL FIELD

The present invention relates to an optical level sensor for accurately detecting the level of a liquid in a container, in particular a removable container, such as for example a liquid soap dispenser for an electric household appliance, such as a washing machine or dishwasher. The invention further relates to a composite lens associated with the optical level sensor.

BACKGROUND ART

It is known, e.g. from JP2007-248375A, to detect the level of a liquid in a tank by means of a float immersed in the liquid and associated with a photo emitting element and a photo receiving element, so as to read the level of the liquid in the tank by means of optical fibers. However, in addition to not being accurate when the liquid level is low and approaches the size order of the float dimensions, such a type of sensor may not be used to detect the level of liquid in a removable container or tank, unless dismantlable electric connections are used.

A level sensor is further known from U.S. Pat. No. 7,191,649 B1, in which the electric element which reads the liquid level is physically separate from the tank, because it is a magnetic field sensitive switch, which is associated with a float immersed in the liquid the level of which it is intended to be measured and which carries a magnet. Although such a type of device is theoretically adaptable to a removable tank, it has the drawback of using a float and is not able to carry out a continuous level measurement, but it may only detect the reaching of a maximum (or minimum) level of liquid which closes (or opens) the switch.

DISCLOSURE OF THE INVENTION

It is an object of the present invention to provide an optical level sensor which is free from the drawbacks of the known sensors and which may be used without any modification both for reading the liquid level in a fixed container and for reading the liquid level in a removable container, without needing to carry out electric disconnections for removing the container. In particular, it is an object of the invention to provide an optical level sensor which may be used on a liquid soap dispenser for an electric household appliance, such as a washing machine or dishwasher, while being cost-effective and simple to be implemented, very reliable and small in size.

The present invention thus relates to an optical level sensor for an electric household appliance, as defined in claim 1.

In particular, the sensor according to the invention is particularly intended to equip a removable container of an electric household appliance, such as for example a liquid soap dispenser for a dishwasher or washing machine, and it only consists of: a photo emitting element and a photo receiving element carried side-by-side by a supporting and feeding element either associated or associable in use with a support for the container, in particular a frame of the electric household appliance; and a composite lens either associated or associable in use with the container, designed so as to remain, in use, immersed in the liquid contained in the container and facing the photo emitting and photo receiving elements.

According to the main aspect of the invention, the composite lens comprises a first cylindrical body made of a light-permeable material, vertically mountable in use from the top of the container facing the photo emitting and photo receiving elements and up to a bottom wall of the container; and a second cylindrical body, arranged concentrically with and externally to the first body and open towards the bottom wall of the container.

The first cylindrical body may be cup-shaped to be mountable in the container with a concavity thereof facing the photo emitting and photo receiving elements and a bottom wall thereof facing and adjacent to, but not in contact with, a bottom wall of the container.

The second cylindrical body is delimited by a side wall arranged facing, and spaced apart from, a corresponding side wall of the first body, over the whole length of the latter, so that a predetermined annular clearance is present between the side walls of the first and second cylindrical bodies, the clearance being accessible in use by the liquid the level of which is intended to be measured; and the side wall of the second cylindrical body is made so as to be at least partially reflecting towards the side wall of the first cylindrical body, e.g. as it is provided with a partially reflecting coating, such as a white layer carried by an internal side surface thereof.

Thereby, an attenuation of a radiation emitted by the photo emitting element and detected by the photo receiving element is proportional to the level of liquid between the side walls of the first and second bodies, as the emitted radiation is reflected and refracted between the side walls of the two cylindrical bodies and the liquid present therebetween.

Therefore, by virtue of the particular shape of the lens according to the invention, the liquid level in a container may be optically measured without using floats and especially without requiring any mechanical or structural connection between the electric/electronic part of the sensor, consisting of the photo emitting and photo receiving elements and the supporting and feeding element, usually made in the form of an electronic board of known type, and the element intended to be mechanically coupled with the container, so as to remain immersed in the liquid the level of which is intended to be measured, consisting of the composite lens.

The lens may thus be temporarily separated from the photo emitting and photo receiving elements, e.g. when the container is extracted from the frame of the electric household appliance to be filled with soap, for example, without carrying out any other operation than extracting the container, then restoring full functionality of the sensor as soon as the container is put back into its place. For this purpose, it is sufficient to provide guiding and positioning means for the removable container so that the lens, at each operation for extracting/inserting the container from/into the frame, is always correctly placed facing the photo emitting and photo receiving elements, which are carried fixed by the frame of the electric household appliance.

As previously mentioned, the invention further relates to a composite lens associated with the optical sensor of the invention and particularly mountable on a removable liquid soap dispenser for an electric household appliance, as defined in claim 9, and to a method for detecting the level of a liquid in a container without using floats, according to claim 12.

BRIEF DESCRIPTION OF THE DRAWINGS

Further features and advantages of the present invention will become apparent from the following description of two preferred embodiments thereof, merely provided by way of non-limitative example, with reference to the accompanying drawings, in which.

PREFERRED EMBODIMENT OF THE INVENTION

Figure 1:
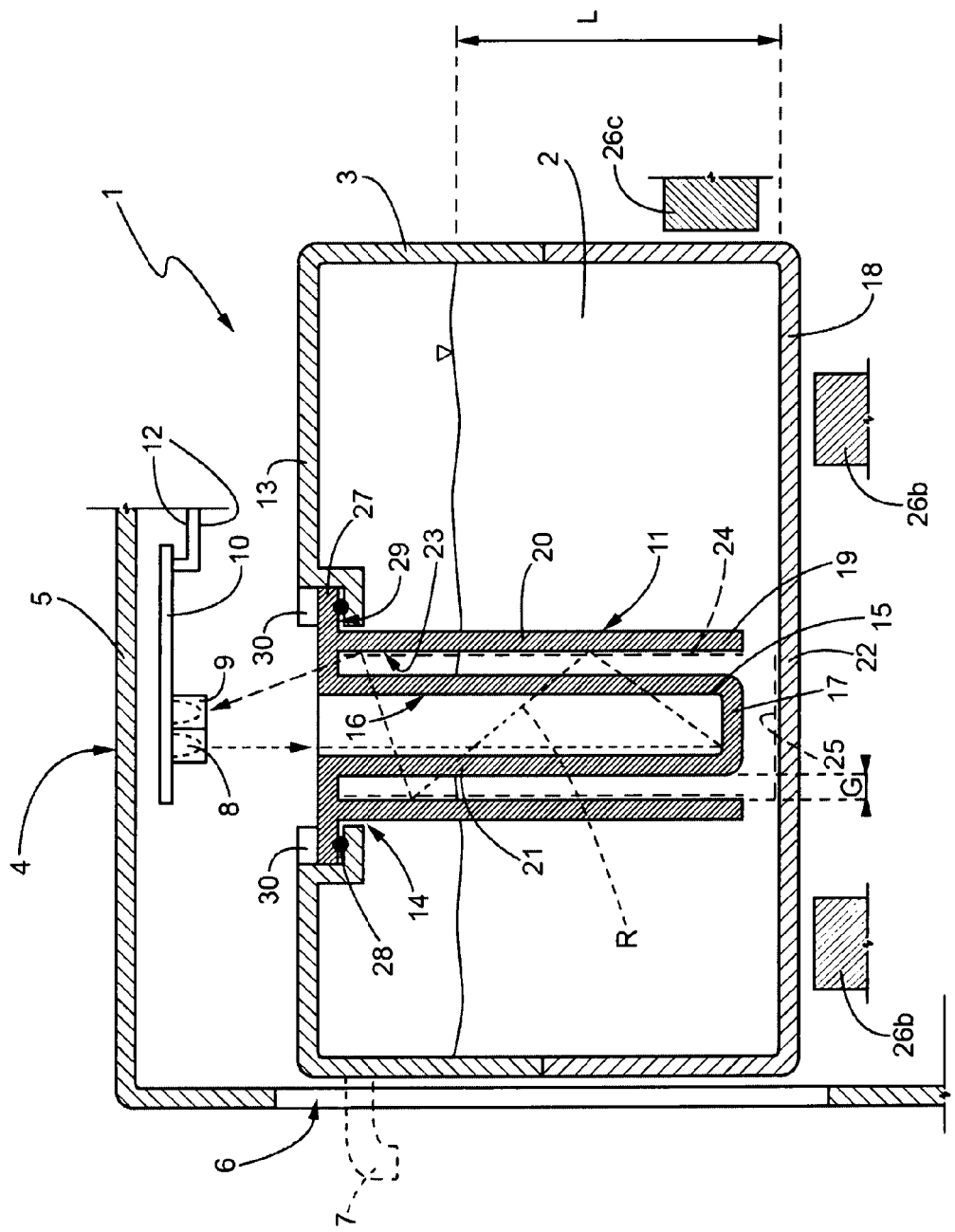
FIG. 1 diagrammatically shows a level sensor for an electric household appliance provided according to the invention.

With reference to FIG. 1, numeral 1 indicates as a whole an optical sensor for detecting the level L of a liquid 2 in a container 3; in particular, as shown, sensor 1 is designed to be adapted to equip a removable and/or extractable container 3 of an electric household appliance 4, only partially and diagrammatically shown for simplicity. For example, container 3 may be a dispenser of a liquid soap 2 for a dishwasher or washing machine 4. In all cases, the electric household appliance 4 is provided with a supporting structure or frame 5, which supports and accommodates container 3 therein, in this case in a front seat 6 of frame 5, from which a container handle 7 (shown with a dashed line) possibly protrudes in use, adapted to allow a user to extract, and possibly remove, the same from seat 6.

Although the following non-limitative description refers to the latter specific case, it is understood that the description applies to any type of container, either a removable container, such as for example the condensation water container of a drier or a conditioner or a dehumidifier, or a fixed container and regardless of the extraction mechanism used, such as the handle 7 or a push-push device or other.

In all cases, the sensor 1 according to the invention only consists of: a photo emitting element 8 and a photo receiving element 9 carried side-by-side by a supporting and feeding element 10 either associated or associable in use to the support 5 for container 3, i.e. in the illustrated case, to the frame 5 of the electric household appliance 4; and of a composite lens 11, which will be described in greater detail below.

In the illustrated example, the supporting and feeding element 10 consists of an electronic board provided with electric wires 12 directly and fixedly connected, in use, to the control unit and services of the electric household appliance 4 (known and not shown for simplicity), on which board 10 the photo emitting element 8 and the photo receiving element 9, e.g. consisting of respective emitting and receiving diodes in a radiation R of any visible, infrared or ultraviolet wavelength, are mounted side-by-side with the respective emission and reception directions oriented substantially perpendicular to the board 10.

Board 10 is further designed to be mounted in use integral with the support (frame) 5 of container 3, facing an upper wall or top 13 of container 3, provided with a seat 14 for thoroughly accommodating the composite lens 11.

Indeed, the composite lens 11 according to the invention is associated (or associatable) with container 3, being designed to remain in use immersed in the liquid 2 contained in container 3 and facing the photo emitting and photo receiving elements 8,9.

In particular, according to an aspect of the invention, composite lens 11 comprises a first cup-shaped, cylindrical body 15 made of a light-permeable material, vertically mountable in use from the top of the container 3 with a concavity 16 thereof facing the photo emitting and photo receiving elements 8,9 and a bottom wall 17 thereof facing and adjacent to, but not in contact with, a bottom wall 18 of container 3.

Lens 11 further comprises a second cylindrical body 19 concentrically arranged radially outside with respect to body 15 and open towards the bottom wall 17; the second cylindrical body 19 is delimited by a side wall arranged facing, and spaced apart from, a corresponding side wall 21 of the first body 15, over the whole length of the latter, so that a predetermined annular clearance or gap G is present between the side walls 21,20 of the first and second cylindrical bodies 15,19, the clearance or gap being accessible in use by the liquid 2 the level of which is intended to be measured.

According to a feature of the invention, the side wall 20 of the second cylindrical body 19 is made so as to be at least partially reflecting for radiation R towards the first body 15 and, in particular, towards the side wall 21 of the latter.

Furthermore, according to a preferred embodiment of the invention, at least one portion 22 of the bottom wall 18 of container 3, facing a light-permeable bottom wall 17 of the first cup-shaped cylindrical body 15 in use, belongs to the lens 11: portion 22 of wall 18 is also made so as to be partially reflecting, this time towards the bottom wall 17 of the first cylindrical body 15.

The first cylindrical body 15 and the second cylindrical body 19 are preferably made integral in one piece with each other, made of the same light-permeable material, e.g. they are made of a transparent, synthetic plastic material, such as polycarbonate or Plexiglass or other. In order to make the side wall 20 at least partially reflecting, an inner side wall 23 of the second cylindrical body 19, facing the first body 15, is then provided with an at least partially reflecting coating 24 (diagrammatically shown by a dashed line), preferably consisting of a white layer, e.g. made by means of an adhesive film or paint.

Similarly, the at least partially reflecting portion 22 (possibly present) of the bottom wall 18 is also made by making container 3 of a normal synthetic plastic material, e.g. also in this case transparent or translucent, and placing an at least partially reflecting coating 25 on portion 22, preferably consisting of a white layer, e.g. again by means of an adhesive film or paint, which in this case is applied by manufacturing container 3 by means of two concave half-shells which are then assembled in container 3 by welding or gluing of the respective peripheral edges, after laying the layer 25.

Finally, according to another aspect of the invention, the bottom wall 17 of the first cylindrical body 15 is a flat wall, arranged in use parallel to the bottom wall 18 of container 3.

Hence, the cylindrical cup-shaped body 15 delimits a cylindrical concavity 16 therein, ending with the bottom wall 17; cylindrical body 15 is made so that the concavity 16 has transversal dimensions equal to the sum of the dimensions of the photo emitting and photo receiving elements 8,9 arranged side-by-side, so that the elements 8,9 always remain facing the bottom wall 17 in use.

Therefore, in the case of a fixed container 3, elements 8,9 and lens 11 are arranged facing in use and are collimated during the step of assembling the electric household appliance 4. In order to obtain the same effect again in case of a removable or even only extractable container 3, the electric household appliance 4, in this case the frame 5, is provided with guiding and positioning means 26, both in the vertical direction 26b and in the extraction direction of container 3 from seat 6, so that the lens 11 is always correctly placed facing the photo emitting and photo receiving elements 8,9, which are instead carried fixed to the frame 5 of the electric household appliance 4, at each operation of extracting/inserting container 3 from/into frame 5.

By virtue of the structure described for sensor 1 as a whole and for lens 11 in particular, the radiation R emitted by element 8 is reflected and refracted in use several times by the walls 17,20,21, and in particular by the layers 23 and 25 (when present), as well as by the liquid 2 present in the annular gap or clearance G.

The level L of liquid 2 present in container 3, which is found as it is in the gap or clearance G, thus causes a greater or lesser attenuation (according to the height of level L) of such a radiation R emitted by the photo emitting element 8. Therefore, this is finally received by the photo receiving element 9 (as only diagrammatically shown without relevance to reality with a dashed line in the figure) where it is detected; the attenuation thereof will thus be proportional to the level L of liquid 2 present between the side walls 20,21 of first body 15 and second body 19, so that the level L of liquid 2 is optically measured according to the invention without using floats, in a very simple manner and with a device of small cost and size. Moreover, the two main components of sensor 1, i.e. board 10 (which carries the elements 8,9) and lens 11, are two completely independent elements not in contact with each other, which should only be correctly aligned to ensure the optimal operation of sensor 1, which is ensured in use by the guiding and positioning means 26. Container 3 which integrally carries lens 11 in use may thus be moved away without any difficulty and without any electric disconnection from the electric household appliance 4, as the board 10 remains fixed to the frame 5 and is completely independent of container 3 from a mechanical and structural point of view.

In order to allow lens 11 to be integrally assembled with container 3, in this case vertically through the seat 14, lens 11 further comprises a flange-shaped assembly portion 27. Additionally, by means of such an assembly portion 27, the second body 19 is also integrally connected to the first body 15.

The flanged-shaped assembly portion 27 is arranged on opposite side of the bottom wall 17 and is shaped to be adapted to cooperate in use with a seal 28 or to self-carry the seal 28 on a lower face 29 thereof facing the bottom wall 17, and is provided with assembly means 30 for determining in use the fluid-tight coupling thereof, and therewith, of the whole lens 11 with the through seat 14 of container 3, which is thus adapted to receive in use the cylindrical bodies 15 and 19 therein, integral with container 3 as described above.

Figure 2:
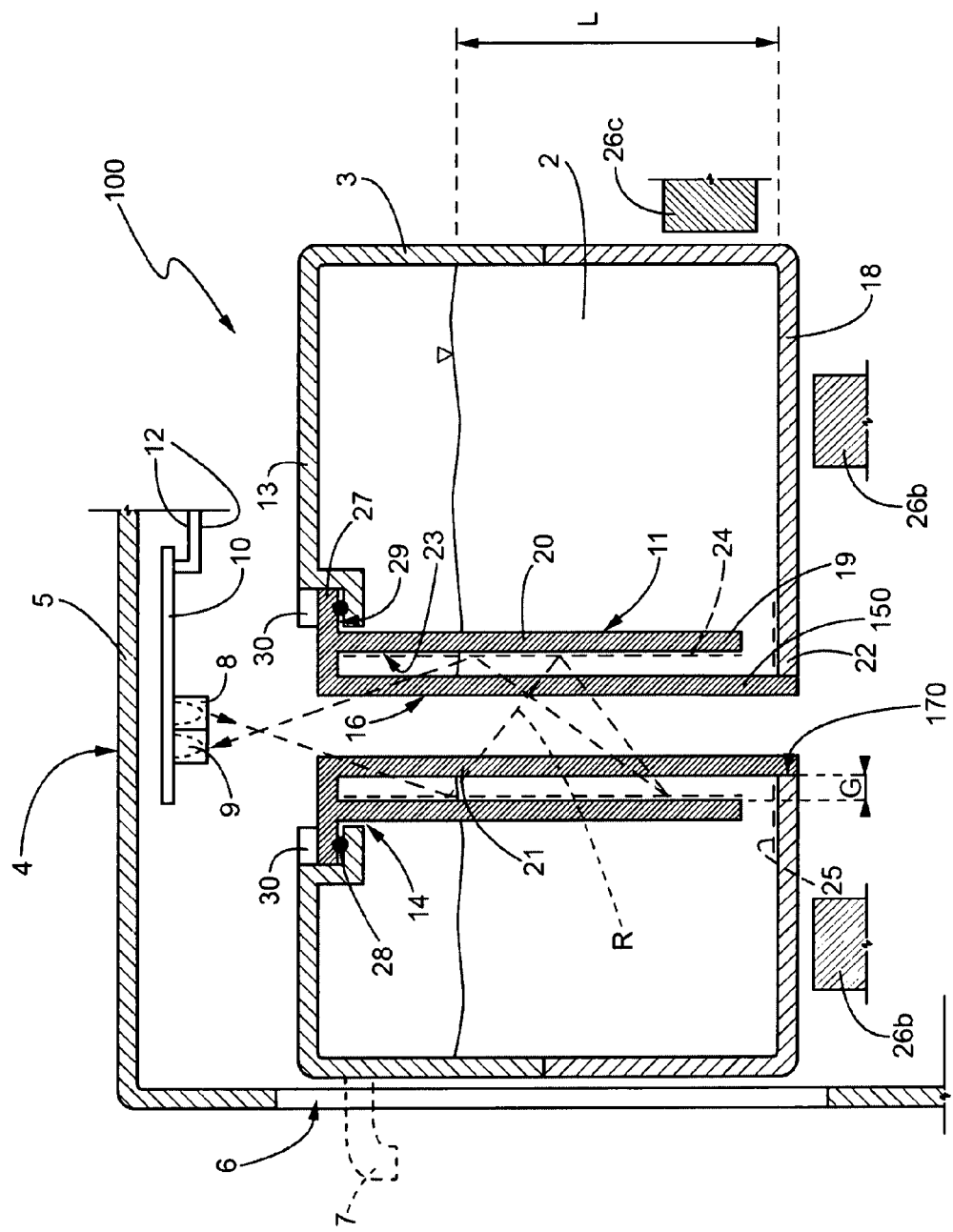
FIG. 2 shows a possible, preferred embodiment of the level sensor in FIG. 1.

Referring now to FIG. 2, a different embodiment 100 of the previously described sensor 1 is shown. Similar or equivalent details to those already described will be indicated with the same numbers for simplicity.

Sensor 100 is intended to equip a container 3 completely similar to the previously described sensor, and differs from sensor 1 only in the shape of lens 11.

In particular, according to an aspect of the invention, the composite lens 11 comprises a first body 150 which instead of being cup-shaped is a cylindrical, tubular body, made of light-permeable material, mountable in use vertically from the top in the container 3, facing the photo emitting and photo receiving elements 8,9 and which extends to a bottom wall 18 of container 3. In particular, the tubular body 150 is open at both opposite ends towards the outside of container 3.

Lens 11 further comprises a second cylindrical body 19, completely similar to that of sensor 1 and arranged, with respect to the body 150, as the body 19 of sensor 1 with respect to the body 15, open towards the bottom wall 18 and provided with an only partially reflecting side wall 20, exactly as in sensor 1.

Furthermore, in the case of sensor 100, at least one portion 22 of the bottom wall 18 of container 3, facing bodies 15 and 190 in use, may also belong to the lens 11 (but it may be preferably omitted): the portion of wall 18 is also made so as to be at least partially reflecting, as in sensor 1.

Similarly, the first cylindrical body 150 may be integrally obtained in one piece with the second cylindrical body 19 of the same light-permeable material, as in the case of sensor 1, or the cylindrical, completely tubular body 150 thus open at both opposite ends thereof is integrally obtained in one piece with the container 3 or part thereof. If obtained independently of container 3, body 150 is fluid-tightly driven, as shown in the example in FIG. 2, into a through hole 170 of portion 22 of the bottom wall 18. Alternatively, body 150 may be integrally obtained in one piece with container 3, e.g. with the lower half-shell. The external body 19 arrives instead only close to the bottom wall 18, but remains in use spaced apart therefrom, so that the liquid the level of which is intended to be measured may enter into the gap G. Thereby, possible condensation phenomena which, in the case of sensor 1 may occur within the internal cavity of the cup-shaped body 15, are avoided.

In practice, the elimination of the bottom wall 17 present in sensor 1 does not produce any appreciable result on the previously described phenomena of reflecting and refracting the radiations emitted by the photo emitting element 8, which thus occur only between the walls 20 and 21 and in the liquid present in use in the gap G.

Body 150 may be obtained in one piece with the flange-shaped portion 27, as in the case of the body 15 of sensor 1, or more simply it may be fluid-tightly driven into a through hole thereof, similarly as seen for hole 170 and wall 18.

The flange-shaped assembly portion 27 may also be shaped in this case to be adapted to cooperate in use with a seal 28 or to self-carry the seal 28 on a lower face thereof.

From the above description, it is finally apparent that an innovative method for optically measuring the level L of a liquid 2 in a container 3 without using floats may be implemented by means of sensor 1 or 100.

The aforesaid method according to the invention will therefore include the following steps:

in container 3, arranging a composite lens 11 as described to be immersed in a liquid 2 contained therein, comprising: a first cylindrical body 15 or 150 made of a light-permeable material, which is vertically mounted in use from the top of container 3 up to a bottom wall 18 of container 3; and a second cylindrical body 19, concentrically arranged outside the first body and open towards the bottom wall 18, delimited by a side wall 20 arranged facing and spaced apart from a corresponding side wall 21 of the first body 15 or 150, over the whole length of the latter, so that a predetermined annular clearance G is present between the side walls 20,21, the clearance being accessible in use by the liquid 2 the level of which is intended to be measured, the side wall 20 of the second cylindrical body 19 being made so as to be at least partially reflecting towards the side wall 21 of the first cylindrical body 15 or 150;

arranging a photo emitting element 8 by the side of and adjacent to a photo receiving element 9, both arranged facing the first cylindrical body 15 or 150 of lens 11;

emitting a radiation R by means of the photo emitting element 8 so that it is reflected and refracted between the side walls 21 and 20 of the first and second cylindrical bodies 15,150 and the liquid 2 present therebetween; and detecting the attenuation of such a reflected and refracted radiation R by means of the photo receiving element 9.

Moreover, such a method will preferably include the step of making at least one portion 22 of a bottom wall 18 of container 3 at least partially reflecting towards the first cylindrical body 15 or 150, by means of a coating 25.

All the objects of the invention are advantageously achieved according to the description.

The invention claimed is:

1. An optical sensor for detecting the level of a liquid in a container, particularly intended to equip a removable container of an electric household appliance, such as for example a liquid soap dispenser for a dishwasher or washing machine, the sensor comprising a photo emitting element and a photo receiving element carried side-by-side by a supporting and feeding element either associated or associable in use with a support for the container, in particular a frame of the electric household appliance, and a composite lens either associated or associable in use with the container, designed so as to remain immersed in the liquid contained in the container and facing the photo emitting and photo receiving elements; characterized in that the composite lens comprises: a first cylindrical body made of a light-permeable material, vertically mountable in use from the top of the container facing the photo emitting and photo receiving elements and up to a bottom wall of the container; and a second cylindrical body, arranged outside the first body and open towards the bottom wall; the second cylindrical body being delimited by a side wall arranged facing, and spaced apart from, a corresponding side wall of the first body, over the whole length of the latter, so that a predetermined annular clearance is present between the side walls of the first and second cylindrical bodies, the clearance being accessible in use by the liquid the level of which is intended to be measured, the side wall of the second cylindrical body being made so as to be at least partially reflecting towards the side wall of the first cylindrical body in such a manner that an attenuation of a radiation emitted by the photo emitting element and detected by the photo receiving element is proportional to the level of liquid present between the side walls of the first and second bodies, so that the level of liquid is optically measured without using floats.

2. A sensor according to claim 1, characterized in that at least one portion of the bottom wall of the container is also made so as to be at least partially reflecting.

3. A sensor according to claim 1, characterized in that said first cylindrical body is cup-shaped and delimits a cylindrical concavity therein, ending with a bottom wall and having transversal dimensions equal to the sum of those of the photo emitting and photo receiving elements arranged side-by-side, so that both always remain in use facing the bottom wall of the first cylindrical body.

4. A sensor according to claim 3, characterized in that said bottom wall of the first cylindrical body is a flat wall, arranged in use parallel to the bottom wall of the container.

5. A sensor according to claim 1, characterized in that said first cylindrical body is tubular and open at both ends towards the outside of the container.

6. A sensor according to claim 1, characterized in that said first and second cylindrical bodies are integrally obtained with each other, made of the same light-permeable material, an inner side surface of the second cylindrical body, facing the first body, being provided with an at least partially reflecting coating.

7. A sensor according to claim 6, characterized in that said at least partially reflecting coating consists of a white layer.

8. A sensor according to claim 1, characterized in that said supporting and feeding element consists of an electronic board on which the photo emitting and photo receiving elements are adjacently mounted, with the respective emission and reception directions oriented substantially perpendicular to the board; the board being designed to be integrally mounted in use with the support for the container, facing an upper wall thereof, provided with a through housing seat for said composite lens.

9. A composite lens for a float-less, optical level sensor, intended to be arranged in use facing a photo emitting element and a photo receiving element adjacently arranged side-by-side, and mounted in a container to be immersed in a liquid contained therein, the lens comprising: a first cylindrical body made of a light-permeable material, mountable in use vertically facing the photo emitting and photo receiving elements and up to a bottom wall of the container; and a second cylindrical body, arranged concentrically with and outside the first body and open towards the bottom wall; the second cylindrical body being delimited by a side wall arranged facing and spaced apart from a corresponding side wall of the first body, over the whole length of the latter, so that a predetermined annular clearance is present between the side walls of the first and second cylindrical bodies, the clearance being accessible in use by the liquid the level of which is intended to be measured, the side wall of the second cylindrical body being made so as to be at least partially reflecting towards the side wall of the first cylindrical body.

10. A composite lens according to claim 9, characterized in that said first and second cylindrical bodies are integrally obtained in one piece with each other and made of the same light-permeable material, an inner side surface of the second cylindrical body, facing the first body, being provided with an at least partially reflecting coating, preferably consisting of a white layer.

11. A composite lens according to claim 9, characterized in that it further comprises a flange-shaped assembly portion adapted to cooperate in use with a seal or self-carrying a seal on a lower face thereof facing the bottom wall of the container and provided with assembly means for determining in use the fluid-tight coupling thereof with a through seat of the container adapted to receive in use said first and second cylindrical bodies.

12. A method for optically measuring the level of a liquid in a container without using floats, characterized in that it comprises the steps of:

in the container, arranging a composite lens immersed in a liquid contained therein, comprising: a first cylindrical body made of a light-permeable material, which is vertically mounted in use from the top of the container up to a bottom wall of the container; and a second cylindrical body, arranged concentrically with and outside the first body and open towards the bottom wall, delimited by a side wall arranged facing and spaced apart from a corresponding side wall of the first body, over the whole length of the latter, so that a predetermined annular clearance is present between the side walls of the first and second cylindrical bodies, the clearance being accessible in use by the liquid the level of which is intended to be measured, the side wall of the second cylindrical body being made so as to be at least partially reflecting towards the side wall of the first cylindrical body;

arranging a photo emitting element by the side of and adjacent to a photo receiving element, both arranged facing the first cylindrical body of the lens;

emitting a radiation by means of the photo emitting element so that this is reflected and refracted between the side walls of the first and second cylindrical bodies and the liquid present therebetween; and detecting the attenuation of such a reflected and refracted radiation by means of the photo receiving element.

13. A method according to claim 12, characterized in that at least part of a bottom wall of the container is also made to be at least partially reflecting towards the first cylindrical body.

14. A sensor according to claim 1, wherein the predetermined annular clearance has a constant length value over at least a portion of the length of the first body.

15. A sensor according to claim 1, wherein the sidewalls of the first and second cylindrical bodies are substantially parallel to one another.

16. A sensor according to claim 1, wherein the first and second cylindrical bodies are concentric with one another.

17. A sensor according to claim 1, wherein at least one of the first cylinder bodies and the second cylinder bodies is open at one end.

18. A sensor according to claim 1, wherein the sensor is configured such that at least respective portions of the cylinder bodies are immersed in the liquid in the length direction.

19. A sensor according to claim 1, wherein the sensor is configured such that at least most of respective portions of the cylinder bodies are immersed in the liquid in the length direction.

20. A lens according to claim 9, wherein at least one of the first cylinder bodies and the second cylinder bodies is open at one end.

21. A method according to claim 12, wherein at least one of the first cylinder bodies and the second cylinder bodies is open at one end.

22. A method according to claim 12, wherein at least respective portions of the cylinder bodies are immersed in the liquid in the length direction.

23. A method according to claim 12, wherein at least most of respective portions of the cylinder bodies are immersed in the liquid in the length direction.

* * * * *